A. H. OTIS.
AUTOMOBILE SIGNALING SYSTEM.
APPLICATION FILED SEPT. 14, 1914.
1,194,537.
Patented Aug. 15, 1916.
2 SHEETS—SHEET 1.
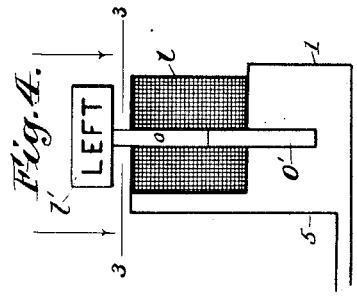
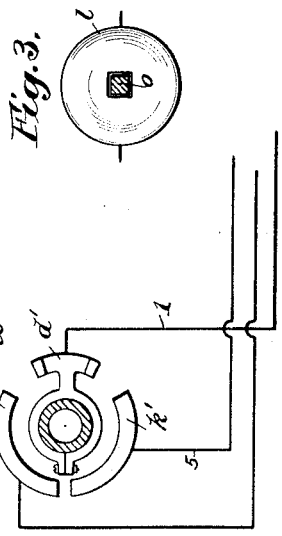
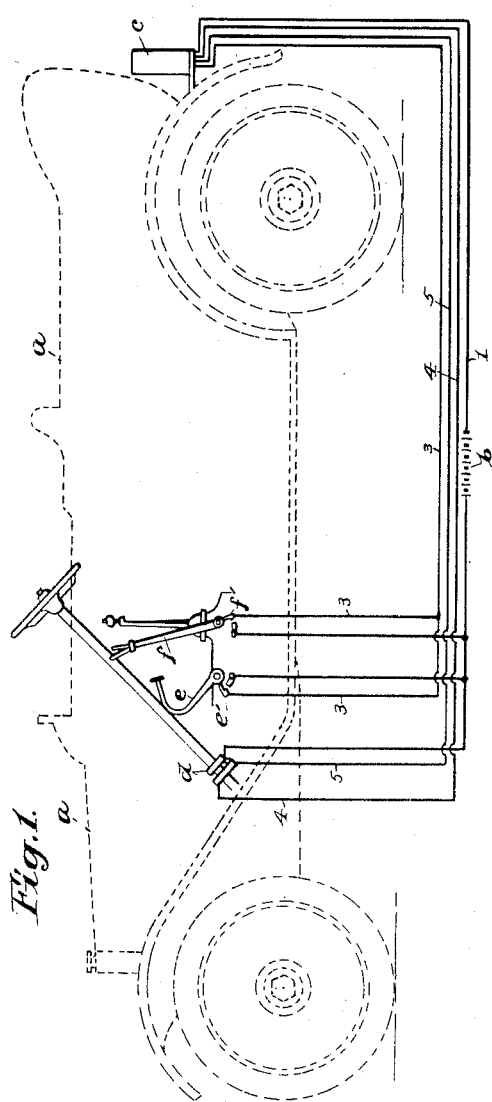
Witnesses.
S. W. Brainard.
W. F. Percy
Inventor:-
Arthur H. Otis,
By A. D. Lawrence
Attorney.

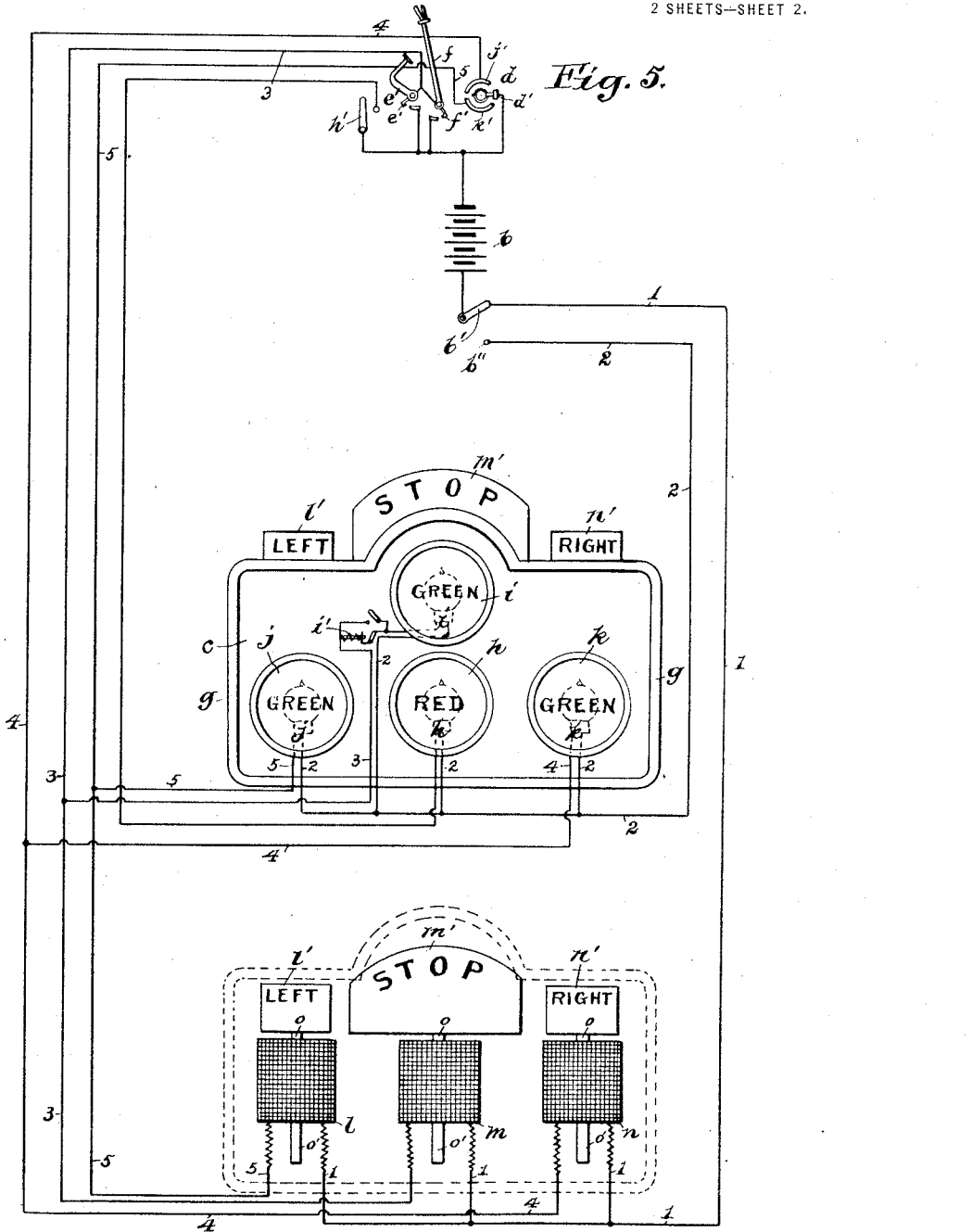

UNITED STATES PATENT OFFICE.

ARTHUR H. OTIS, OF CLEVELAND HEIGHTS, OHIO.

AUTOMOBILE SIGNALING SYSTEM.

1,194,537.   Specification of Letters Patent.   Patented Aug. 15, 1916.

Application filed September 14, 1914. Serial No. 861,666.

*To all whom it may concern:*

Be it known that I, ARTHUR H. OTIS, a citizen of the United States, residing at Cleveland Heights, in the county of Cuyahoga and State of Ohio, have invented certain new and useful Improvements in Automobile Signaling Systems, of which the following is a specification.

My invention relates to improvements in automobile signaling systems, and more particularly to one that affords automatic actuation for the purpose of indicating by means of lights, targets or other forms of signal, the varying running conditions of the automobile.

The object of my invention is to dispense with any conscious act on the part of the chauffeur or driver of the car, while providing a comprehensive signaling system for indicating to a vehicle at the rear, the direction in which the automobile is turned, and the checking or stoppage of the vehicle.

A number of appliances have previously been suggested for permitting the mauual indication of the running condition of an automobile, but these have required the conscious manual control of the driver, thereby detracting from his control of the machine and moreover, rendering the signals either misleading in point of time and duration, with the possibility of error through mistaking the signal given. In other words, by requiring the attention of the driver for the purpose of setting and releasing the signal, his attention is taken from the road and adjacent vehicles, both upon setting and releasing the signal, and it is impossible to avoid the chance of error and the delay in actuating the signals. Accordingly, I have sought to overcome these and other disadvantages, and provide a simple signaling system adapted for use upon an automobile.

Preferably my improvement is embodied in an electrical signaling system, because of its greater adaptability and the common equipment with an electric battery. The battery may, of course, be utilized for transmitting various forms of signals, such as audible, visible or lighting signals, and the latter forms are herein explained in connection with signaling targets to be used by day and electric lights to be used by night in giving the signals.

The apparatus for signaling preferably is associated with the tail light of the car, and is positioned at the rear of the automobile, while the controlling apparatus is associated respectively with the steering gear, the foot and the emergency brakes or with the clutch release, as desired.

The details of my improvements will be explained more fully in connection with the accompanying drawings wherein:—

Figure 1 is a view of diagrammatic character, showing an automobile in outline, equipped with the foregoing signaling apparatus. Fig. 2 is a plan view of the controlling apparatus applied to the steering gear. Fig. 3 is a view in section on line 3—3 of Fig. 4 which shows the actuating solenoid for one of the targets, and Fig. 5 is an enlarged diagrammatic view showing the complete circuit of the targets and lamps of the signaling apparatus displaced, and for the purpose of explanation, also showing all of the targets displayed, which is impossible in practice, or with the contacts open as shown in the diagram.

Throughout the several figures of the drawings, I have employed the same character of reference to indicate similar parts.

Referring first to Fig. 1, the automobile is shown in dotted outline $a$, with the signaling device $c$ at the rear, which is diagrammatically connected with the battery $b$, and the respective controlling apparatuses $d$ of the steering gear, $e$ of the foot brake or clutch release, as may be desired, and $f$ of the emergency brake. The latter as will be understood, normally releases the clutch in practice. Further details of the automobile and its running gear, brakes, etc., are not necessary for the explanation of my invention, and may profitably be omitted for that reason.

Referring now to Fig. 5, it is seen that the signaling apparatus $c$ is composite, comprising a casing $g$ which contains four colored lenses $h$, $i$, $j$, $k$, with their corresponding electric lamps individual thereto, and three solenoids $l$, $m$, and $n$, respectively controlling the signaling targets $l'$ $m'$ and $n'$. The lens $h$ and its lamp, constitute the usual tail light and this alone is manually controlled by the switch $h'$. The other lamps and the solenoids are peculiar to my automatically controlled signaling system as will now be explained.

The battery $b$ is provided with a switch $b'$ controlling alternatively the day and night signals. In the position shown, said switch connects the battery with the common lead or conductor $l$ for the solenoids or day signals, but if moved to contact $b''$, the corresponding night signals or lamps would be connected in circuit through conductor 2.

Referring to the upper portion of the diagram Fig. 5, which shows the controlling apparatus, it will be seen that the solenoid $m$ (or alternatively the lamp $i$) is connected by conductor 3 with the contacts $e'$ and $f'$ respectively on the foot lever $e$ and the emergency brake $f$. This solenoid, in consequence, is adapted to display the target $m'$ "Stop" whenever the foot lever is depressed or the emergency brake is actuated. Circuit is readily traced from the battery through conductor $l$, solenoid $m$, conductor 3 and either contact $e'$ or $f'$ to the other side of the battery. By this arrangement the stop signal is automatically set when the brakes are applied and the clutch released, and said signal is automatically retired upon releasing the brakes, through the disengagement of the respective contacts.

An analogous control of the "left" and "right" signals is provided in connection with the apparatus $d$ associated with the steering gear. This comprises contacts $d'$ $j'$ and $k'$; the latter of which are stationary and are adapted alternatively to be engaged by the contact $d'$ which is rotated with the steering gear. As better shown in the enlarged drawing Fig. 2, the contact $d'$ has an appreciable arc of movement both to the right and left to accommodate the ordinary steering conditions of the automobile upon the road, without engaging the respective contacts $j'$ and $k'$. This is to prevent the actuation of the direction signals unless the car is caused to make an abrupt turn, such as required in going around a street corner for example. Contact $j'$ is connected with solenoid $l$ and contact $k'$ with solenoid $n$. Multiple connections are respectively provided for the lamps illuminating the direction-indicating lenses $j$ and $k$.

Assuming that the steering gear is thrown sharply to the right, contact $d'$ will be engaged with contact $j'$ throughout a considerable arc and cause the flow of current from battery $b$ through conductor $l$, solenoid $n$, conductor 4 and engaged contacts $j'$ $d'$ to the opposite side of the battery. This will energize the solenoid $n$ and display the target $n'$ bearing the word "Right" and similarly, excitation of the solenoid $l$ would occur through the engagement of contacts of $d'$ and $k'$, when the automobile is turned sharply to the left, the circuit being established over conductor 5, and it being understood that the steering gear contacts in the diagrams are shown as viewed from below.

Referring to Figs. 3 and 4, it is seen that the solenoids, of which $l$ may be taken as an example, are each provided with a non-magnetic stem $o$ carrying at opposite ends, the target $l'$ and the magnetic core $o'$. These members preferably are square in cross section, in order to retain the target in its alinement.

Merely by throwing the switch $b'$, the several lamps are cut into circuit upon engaging the contact $b''$ or in an intermediate position, both the solenoids and lamps are cut out of circuit if desired. In consequence, the corresponding lamps are lighted and extinguished over the same controlling circuits, which do not require detailed explantion, except with respect to lamp $i$, which preferably is provided with an electromagnetic or thermo-electric interrupter, $i'$, adapted to flash the lamp and render the stop signal more distinctive at night. The "right" and "left" night signals $j$ $k$ are indicated respectively by their positions, as compared with the tail light $h$.

Those skilled in the art will now understand the manner in which my improved signaling system provides for the automatic setting and releasing of signals, which will indicate to a following vehicle, either the checking or stoppage of the automobile thus equipped, and the direction in which said automobile is turning off the road. These signals are instantaneous in addition to being automatic, and therefore are not liable to confuse the observer or give delayed indications of the car's running condition. It is equally important to observe that the signaling system requires no attention whatever on the part of the driver of the car thus equipped, and leaves him free to avoid accidents and direct his car over the most favorable portions of the road.

In the drawings, I have indicated a color scheme of red and green lenses for the night signals and have shown in diagram, an interrupter with its cut out switch for flashing the "stop" signaling or other lamps. These features and other structural details are not essential to my invention, except as hereinafter defined in the claims.

Having now explained the preferred features of my improvements, I claim as new and desire to secure by Letters Patent, the following:

1. An automatic signaling system for automobiles, comprising a tail lamp and a stop signaling lamp, circuit connections and a battery respectively connected with said lamps, said battery being common to all circuits, said tail lamp being normally lighted, a flashing apparatus associated with said stop-signaling lamp and caused to operate when the said lamp circuit is closed, brake and clutch levers of the automobile, and contacts in said stop-signaling lamp circuit associated with said levers for automatically setting and extinguishing said stop signaling lamp.

2. An automatic signaling system for automobiles, comprising a plurality of electric lamps, two being direction lamps, one a stop-signaling lamp, and another a tail lamp, circuit connections and a battery respectively connected with said lamps, said battery being common to all the circuits, said tail lamp being normally lighted and definitely positioned with respect to the other lamps, a flashing apparatus associated with said stop-signaling lamp and caused to operate when said lamp circuit is closed, controlling mechanism for actuating the steering gear, brakes and clutch of the automobile, and contacts in said circuits actuated by and respectively associated with said controlling mechanism for automatically setting and extinguishing the different lamp signals, said brake and clutch controlling mechanism when actuated for completing a circuit causing the stop-signaling lamp to be operated, and the controlling mechanism of the steering gear when actuated operating one or the other of the direction lamps.

3. In signals for vehicles, consisting of a plurality of direction targets and a stop target, an electric battery, a plurality of normally open circuits between said battery and target signals, a steering column and foot and hand levers, a plurality of contacts in said circuits and associated with the steering column and levers, said steering column being adapted to engage a contact upon the rotation of the steering column for closing one or the other of the direction target circuits for operating one of the direction target signals, said levers when actuated causing a circuit to be closed and the stop target signal to be operated, a plurality of direction and stop lamp signals connected to said open circuits, and means for breaking the circuit between the target signals and the battery and closing the circuit between the lamp signals and battery, said steering column and brake levers being adapted to automatically operate said direction and stop lamp signals, respectively.

In testimony whereof I do now affix my signature in the presence of two witnesses.

ARTHUR H. OTIS.

Witnesses:
F. C. KNIGHT,
ALBERT LYNN LAWRENCE.